A. CAMPBELL.
DUMP CAR AND DOOR OPERATING MECHANISM THEREFOR.
APPLICATION FILED JUNE 24, 1921.
1,402,836.
Patented Jan. 10, 1922.
2 SHEETS—SHEET 1.
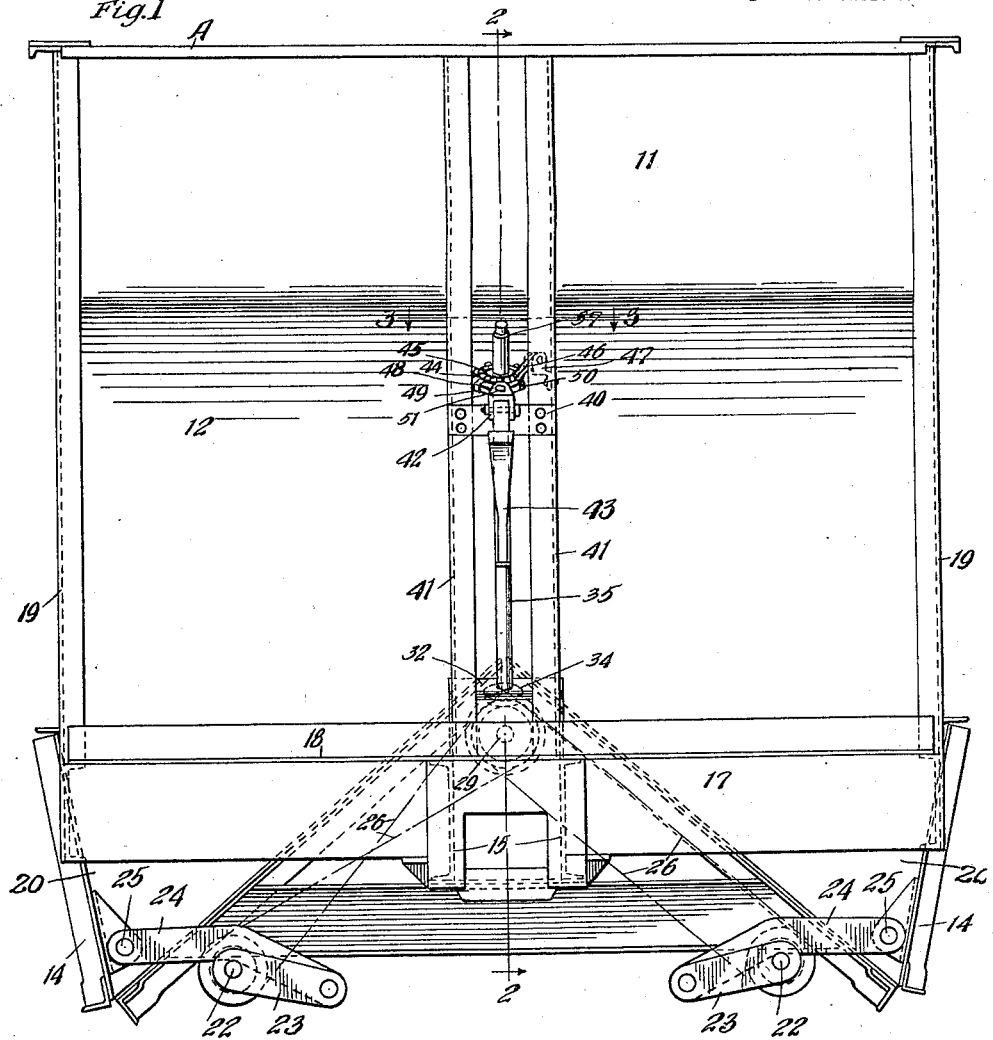
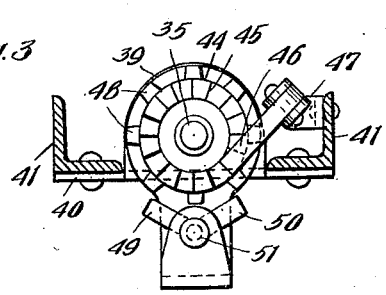
Inventor
Argyle Campbell
By Geo. I. Haight
His Atty.

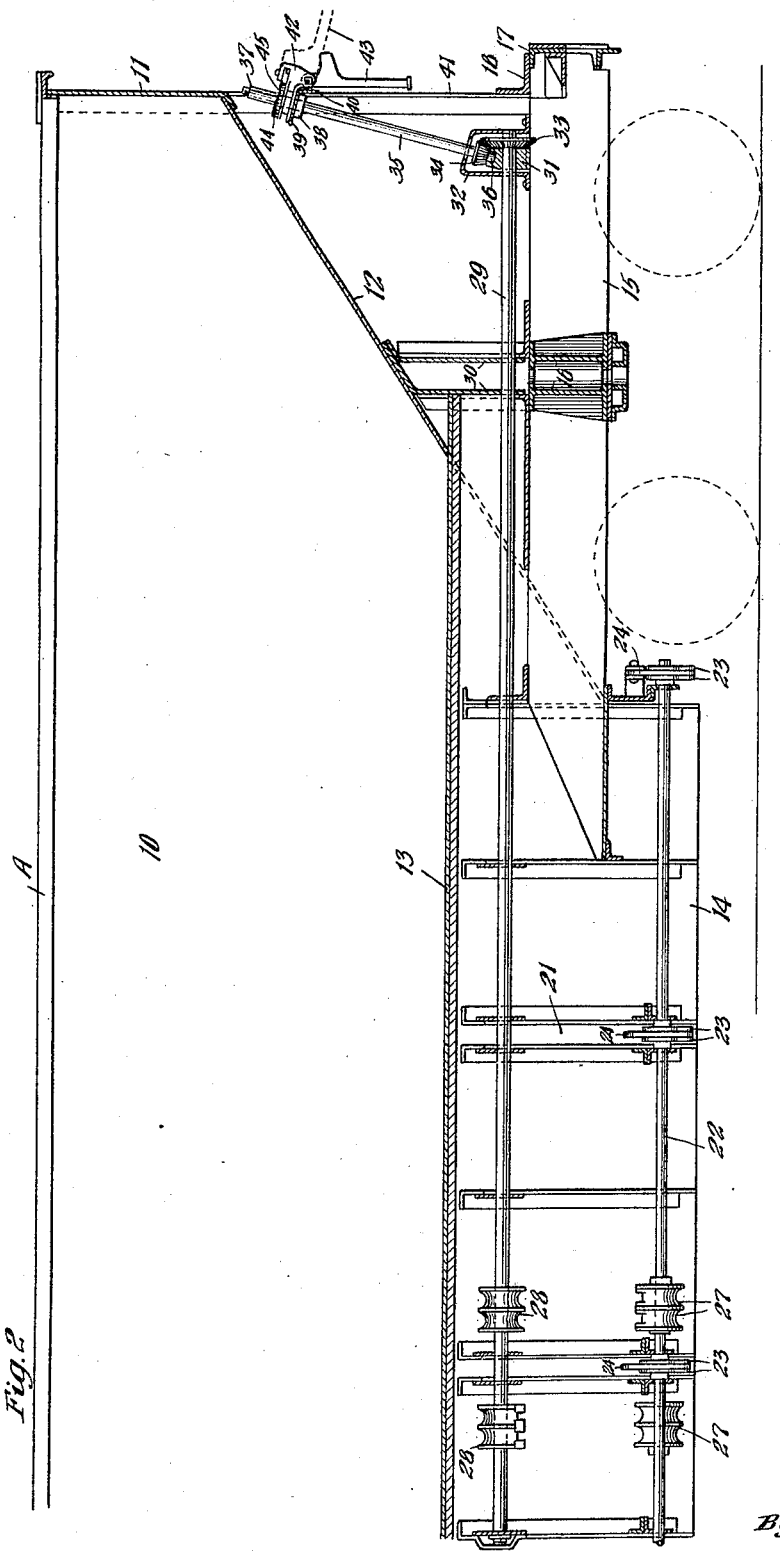

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

DUMP CAR AND DOOR-OPERATING MECHANISM THEREFOR.

1,402,836. Specification of Letters Patent. Patented Jan. 10, 1922.

Application filed June 24, 1921. Serial No. 479,987.

*To all whom it may concern:*

Be it known that I, ARGYLE CAMPBELL, a citizen of the United States, residing at Chicago, in the county of Cook and State of Illinois, have invented a certain new and useful Improvement in Dump Cars and Door-Operating Mechanism Therefor, of which the following is a full, clear, concise, and exact description, reference being had to the accompanying drawings, forming a part of this specification.

This invention relates to improvements in dump cars and door operating mechanism therefor.

One object of the invention is to provide a simple and efficient door operating mechanism and, more particularly, for dump cars of the side dumping type commonly used for coal, coke and similar materials and wherein the operator is required to position himself at the end of the car during the unloading of the car or closing the doors.

Another object of the invention is to provide a dump car and door operating mechanism therefor, so arranged that the door operating mechanism may be conveniently and safely operated at the end of the car in a manner similar to the operation of ratchet hand brakes now commonly employed on cars.

Other objects of the invention will more clearly appear from the description and claims hereinafter following:

In the drawings forming a part of this specification, Figure 1 is an end elevational view of a dump car illustrating my improvements in connection therewith. Fig. 2 is a longitudinal, central, vertical section of the dump car shown in Fig. 1 and corresponding substantially to the line 2—2 thereon. Fig. 3 is a detail sectional view corresponding substantially to the section line 3—3 of Fig. 1.

In said drawings, the car is designated generally by the reference letter A, the same being of that type having vertical side walls 10—10, vertical end walls 11—11, sloping end hopper bottom walls 12—12 and a central longitudinally extending ridge 13, dividing the car into side dumping hoppers, as clearly appears from Fig. 1. The car is provided along the sides thereof with a plurality of side dumping hopper doors 14—14, preferably four on a side, the same being hinged along their top edges in any suitable manner to the side sills or side walls of the car. The draft sills of the car are indicated at 15 in Fig. 2, the bolster at 16 and the end sill at 17 with a narrow platform provided at 18 above the end sill. The end walls 11 of the car are suitably braced by angle posts 19—19. The ends of the individual hoppers are defined by transverse vertical hopper sheets 20—20, as indicated in Fig. 1, there being spaces between the hoppers as indicated at 21, to accommodate the elements of the door mechanism, hereinafter described.

The doors are all preferably operated simultaneously. Along each side of the car under the downwardly and outwardly sloping hopper sheets, is extended a shaft 22 mounted in suitable brackets supported by the cross members of the car underframe and hoppers. Said shaft 22 is provided at intervals therealong with rigid arms 23 to which are pivoted bent links 24, the opposite ends of the latter being in turn pivoted as indicated at 25 to suitable brackets on the doors 14. As will be understood by those skilled in the art, the links 24 are connected to the doors at the ends of the latter or to connectors between the doors so that the doors may all be operated simultaneously. As clearly appears from Fig. 1, the points of pivotal connection at the ends of the links 24 are so disposed that a line joining the same will pass either through or slightly below the axis of the shafts 22 when the doors are in closed position. With this arrangement, the mechanism is made substantially self-locking and the shafts 22 relieved of torsional strain while carrying the load.

The shafts 22 are simultaneously operated by a plurality of chains or other equivalent flexible connections 26—26 which pass over sheave wheels 27 and 28 on the shafts 22 and 29, respectively. As indicated conventionally in Fig. 1, one of the chains 26 will be crossed so that, as the shaft 29 is rotated in one direction, the two shafts 22 will be rotated in opposite directions due to the left and right hand mounting of the doors.

The shaft 29 is located just beneath the apex of the ridge 13, that is, it extends centrally horizontally and longitudinally of the car and for a distance slightly more than one-half of the length of the car. The center of the car is between the two sets of sheave wheels 28—28 and it will be seen that the shaft 29 terminates slightly to the left thereof, as viewed in Fig. 2. Said shaft 29 is mounted in suitable bearings carried by the cross members of the car underframe, the righthand end of the shaft, as viewed in Fig. 2, being extended through bolster extension plates 30—30. The end of the shaft 29 is located adjacent the end sill of the car and just inside of the plane of the end wall 11 of the car and the vertical angle braces 41—41. At the said end, the shaft 29 is mounted in a suitable bearing 31 mounted on top of the sills 15. A suitable housing or casing 32 encloses the bearing 31 and the adjacent parts of the door operating mechanism as indicated in Fig. 1.

Secured on the extreme end of the shaft 29 is a bevel gear 33 which meshes with a smaller bevel gear 34 secured to the lower end of a shaft 35. The latter has its lower end suitably journaled in the bearing block 31 as indicated at 36. The ratio of the bevel gears 33 and 34 is preferably as 2:1.

The shaft 35 extends upwardly at a slight outward inclination sufficient to bring the upper end thereof as indicated at 37 approximately in the vertical plane of the end wall 11 of the car. Said shaft 35 is centrally disposed with respect to the two braces 41—41. Near its upper end, the shaft 35 is journaled in a bearing 38 secured to a transversely extending plate 39 which has an outer vertically extending flange 40 secured to the braces or posts 41—41.

Freely rotatably mounted on the shaft 35 above the plate 39 is a hanger or carrier 42 to which is pivotally attached a gravity drop operating handle 43. Above the hanger 42, there is rigidly secured to the shaft 35 a ratchet wheel 44. Said ratchet wheel 44 is provided on the upper face thereof with a series of ratchet teeth 45 with which is adapted to co-operate a locking dog 46 pivotally attached to a suitable bracket as indicated at 47 in Fig. 3.

Around its periphery said wheel 44 is provided with a series of substantially vertically extending teeth 48 with which are adapted to co-operate two independent pawls 49 and 50 pivotally attached to the hanger 42 about the common pivot pin 51 as best shown in Fig. 3.

The operation is as follows, assuming the parts in positions shown in the drawings. To open the doors, the operator first disengages the locking dog 46 and then throws the pawl 50 into operative position and, after lifting the handle 43 to the dotted line position shown in Fig. 2, pulls said handle toward him thus effecting a clockwise rotation of the shaft 29, as viewed in Fig. 1. This serves to rotate the shafts 22—22 in proper directions, moving the linkages from their self-locking position and allowing the hopper doors to open under the influence of the discharging load. In this connection it will be understood that the ratchet wheel 44 will be free to run past the pawl 50. To close the doors, the operator employs the other pawl 49 and reverses the motion of the operating handle as will be understood.

From the preceding description, taken in connection with the drawings, it will be observed that the operator may operate the door mechanism while standing on the end sill structure of the car. The manner of operating the door mechanism is substantially identical with the now common method of operating hand brakes by ratchet devices involving a gravity drop handle so that the operator is not required to acquaint himself with any novel method of operation. It will also be noted that the handle 43 drops to a position well within the plane of the end sill of the car so that no undesirable projection or obstruction is presented between the ends of adjacent cars. There is also ample clearance between two cars under any ordinary condition for operating the handle 43 even when the latter is in its elevated position. All of the parts of the mechanism are substantially protected by the various parts of the car body structure proper and the arrangement is exceedingly simple, relatively inexpensive to manufacture and apply and of rugged construction.

I have herein shown and described what I now consider the preferred manner of carrying out the invention, but the same is merely illustrative and I contemplate all changes and modifications that come within the scope of the claims appended hereto.

I claim:

1. In a dump car having a longitudinally extending central ridge and side dumping hopper doors; the combination with a longitudinally and horizontally extending shaft disposed beneath the apex of said ridge in a plane above the draft sills of the car, one end of said shaft terminating slightly within the vertical plane of the end wall of the car; of connections between said shaft and doors; a second shaft extending upwardly at a slight outward inclination from said end of said first named shaft; operative gearing between said shafts; and pawl and ratchet mechanism for rotating said second named shaft, said mechanism including, a gravity drop handle.

2. In a dump car having a longitudinally extending central ridge, side dump hopper doors, vertical end walls, draft sills, and vertically extending end posts located adjacent the center line of the car; the combination with a longitudinally and horizontally extending shaft disposed beneath the apex of said ridge and above said draft sills, one end of said shaft terminating a short distance inside of the end posts at one end of the car; a second shaft extending at an upward slight outward inclination from a point adjacent said end of the first named shaft to a point between and substantially in the plane of said end posts; operative gearing between said shafts; connections between said first named shaft and the hopper doors; a bearing member for the upper end of said second named shaft, said bearing member being supported by said posts; and means, accessible for operation by an operator standing upon the end sill structure of the car for effecting rotation of said second named shaft, said means including a ratchet wheel rigid with said second named shaft, a hanger loosely rotatably mounted on said shaft, oppositely acting pawls carried by said hanger, a gravity drop handle pivotally connected to the hanger, and a locking dog for preventing accidental rotation of said shaft in an unwinding direction.

3. In a dump car having hopper doors; the combination with a shaft extending lengthwise of the car; of connections between said shaft and the hopper doors; a second shaft extending upwardly and outwardly from a point adjacent one end of said first named shaft; operative gearing between said shafts; and means for effecting step by step rotation of said second shaft said means including, a ratchet wheel secured to said shaft, a hanger loosely rotatably mounted in said shaft adjacent the ratchet wheel; a gravity drop handle pivotally attached to said hanger, and a pawl carried by said hanger cooperable with said ratchet wheel.

4. In a dump car having a longitudinally extending central ridge, hopper doors, vertical end walls, vertical end posts located adjacent the center line of the car and an end sill platform; the combination with a longitudinally and horizontally extending shaft disposed beneath the apex of said ridge and terminating at one end at a point above said platform inside of the corresponding adjacent end posts and closely adjacent thereto; of connections between said shaft and hopper doors; a second shaft extending upwardly at a slight outward inclination from a point adjacent said end of the first named shaft to a point between said posts and substantially in the plane of the end wall of the car; gearing between said shafts; and pawl and ratchet mechanism, including a gravity drop handle, for rotating said second shaft step by step.

In witness that I claim the foregoing I have hereunto subscribed my name this 9th day of June, 1921.

ARGYLE CAMPBELL.

Witnesses:
CARRIE GAILING,
ANN BAKER.